(12) United States Patent
Fritz et al.

(10) Patent No.: US 11,198,145 B2
(45) Date of Patent: Dec. 14, 2021

(54) DEVICE, SYSTEM, COMPONENT, METHOD AND COMPOSITION FOR PREVENTING DEPOSITS OF A DISPOSAL SUBSTANCE IN COATING INSTALLATIONS

(71) Applicant: Dürr Systems AG, Bietigheim-Bissingen (DE)

(72) Inventors: Hans-Georg Fritz, Ostfildern (DE); Marcus Kleiner, Ingersheim (DE); Michael Zabel, Winnenden (DE); Benjamin Wöhr, Eibensbach (DE); Georg M. Sommer, Ludwigsburg (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 16/748,887

(22) Filed: Jan. 22, 2020

(65) Prior Publication Data
US 2020/0156101 A1 May 21, 2020

Related U.S. Application Data

(62) Division of application No. 13/509,325, filed as application No. PCT/EP2010/006882 on Nov. 11, 2010, now abandoned.

(30) Foreign Application Priority Data

Nov. 11, 2009 (DE) .......................... 102009052655.2

(51) Int. Cl.
| | | |
|---|---|---|
| *B05B 14/46* | (2018.01) | |
| *C08G 18/28* | (2006.01) | |
| *C08G 18/80* | (2006.01) | |
| *C09D 175/00* | (2006.01) | |
| *B05B 15/55* | (2018.01) | |
| *C09D 7/00* | (2018.01) | |

(52) U.S. Cl.
CPC .............. *B05B 14/46* (2018.02); *B05B 15/55* (2018.02); *C08G 18/282* (2013.01); *C08G 18/8064* (2013.01); *C09D 7/71* (2018.01); *C09D 175/00* (2013.01); *Y02P 70/10* (2015.11)

(58) Field of Classification Search
CPC ....... B05B 14/46; B05B 15/55; C08G 18/282; C08G 18/8064; C09D 175/00; C09D 7/71; Y02P 70/10
See application file for complete search history.

(56) References Cited

U.S. PATENT DOCUMENTS

| | | |
|---|---|---|
| 3,488,044 A | 1/1970 | Shepherd |
| 4,017,438 A | 4/1977 | Jerabek et al. |
| 4,590,101 A | 5/1986 | Knapczyk |
| 4,794,154 A | 12/1988 | Benefiel |
| 4,979,154 A | 12/1990 | Broudeur |
| 5,281,629 A | 1/1994 | Hovestadt et al. |
| 5,344,851 A | 9/1994 | Hovestadt et al. |
| 2003/0090034 A1 | 5/2003 | Mulhaupt |
| 2009/0031949 A1 | 2/2009 | Nagase et al. |
| 2010/0092733 A1 | 4/2010 | Belpaire et al. |
| 2010/0133353 A1 | 6/2010 | Herre |
| 2011/0262324 A1 | 10/2011 | Fritz et al. |
| 2015/0247054 A1 | 9/2015 | Nogai |

FOREIGN PATENT DOCUMENTS

| | | |
|---|---|---|
| CN | 101557881 A | 10/2009 |
| DE | 236023 A1 | 5/1986 |
| DE | 4211465 A1 | 10/1993 |
| DE | 19835333 A1 | 2/2000 |
| DE | 10240073 A1 | 12/2003 |
| DE | 102004061322 A1 | 6/2006 |
| EP | 0556670 A1 | 8/1993 |
| EP | 0569756 A1 | 11/1993 |
| EP | 1312419 A1 | 5/2003 |
| GB | 2119280 A | 11/1983 |
| JP | 5186564 A | 7/1993 |
| WO | 2007039276 A1 | 4/2007 |
| WO | 2008077944 A1 | 7/2008 |
| WO | 2009026995 A1 | 3/2009 |
| WO | 2009026996 A1 | 3/2009 |

OTHER PUBLICATIONS

EPO Office Action for Application No. 10 781 613.4 dated May 18, 2016 (5 pages).
International Search Report for PCT/EP2010/006882 dated Feb. 4, 2011 (with English translation; 6 pages).

*Primary Examiner* — Patrick D Niland
(74) *Attorney, Agent, or Firm* — Bejin Bieneman PLC

(57) ABSTRACT

A device, method, system, operating method, component and composition are disclosed for preventing deposits of a disposal agent, e.g., where a multi-component paint having two or more components such as a paint component and a hardener component, is employed, for example in a coating installation. Exemplary illustrations include a receiving device for disposal agent, e.g., for disposal agent from cleaning and/or rinsing processes of an application apparatus, comprising at least one inlet opening for introducing the disposal agent, and an outlet opening for removing the disposal agent. Furthermore, at least one loading means may be provided in order to load the receiving device with a loading agent, which may at least delay a deposition of disposal agent on or in the receiving device.

19 Claims, 7 Drawing Sheets

DEVICE, SYSTEM, COMPONENT, METHOD AND COMPOSITION FOR PREVENTING DEPOSITS OF A DISPOSAL SUBSTANCE IN COATING INSTALLATIONS

CROSS-REFERENCES TO RELATED APPLICATIONS

This application is a divisional of U.S. patent application Ser. No. 13/509,325 filed on May 11, 2012, a National Stage application which claims the benefit of International Application No. PCT/EP2010/006882 filed Nov. 11, 2010, which claims priority based on German Application No. DE 10 2009 052 655.2, filed Nov. 11, 2009, which applications are incorporated herein by reference in their entireties.

BACKGROUND

The present disclosure relates to a receiving device for disposal agents and a method for receiving disposal agents. The present disclosure further relates to a disposal system for disposal agents and a method for operating the disposal system. The present disclosure further relates to a composition, a use and/or method of using, and a coating installation component, which each comprise a blocking agent to at least delay hardening of a multi-component paint system, e.g., directed to application of a paint having two or more components, and may be referred to herein as a two-component or more-component paint.

Application apparatuses such as atomizers, colour changers etc. for coating motor vehicle body parts typically must be cleaned or rinsed at regular intervals. Cleaning or rinsing can be necessary to prevent deposition of coating agents, e.g. of paint, on or in the application apparatus. Cleaning or rinsing can also be necessary for a colour change to prevent paint residues of the wrong colour contaminating the paint to be applied, which can lead to a loss in quality of the part to be coated or even make it unusable.

What is known as overspray usually occurs during the painting process. Overspray means the portion of coating agent which does not reach the component to be coated and is usually separated in a wet or dry separation. In wet wash-out, separation usually takes place with the aid of water, whereas in dry wash-out the separation usually takes place with the aid of e.g. rock meal (calcium carbonate).

In coating installations with wet wash-out, single-component paint which is to be disposed of e.g. during (pre-) loading, colour change or during rinsing or cleaning processes is either introduced into receiving containers, from which it is then conducted away via lines, or directly sprayed into the wash-out. However, with two-component paints, i.e. paints, which have a paint component and a hardener component and are usually mixed in predefined ratios shortly before application and then usually harden rapidly, only direct introduction into the wash-out essentially comes into consideration. When disposing of two-component paints there is in particular a risk that pre-reacted or fully reacted paint is deposited on parts of the disposal system e.g. on the receiving containers, discharge lines etc. Deposits in lines can result in narrowing of the cross section and in extreme cases to complete blockage of the line.

During dry wash-out, the spraying of large quantities of paint at essentially the same point, such as the rinsing position of a painting robot, can adversely affect the separation system, as paint flowing down the inner surfaces of the booth cannot be picked up by the precoat material (e.g. calcium carbonate). The dry separation system is designed to pick up paint particles or very small paint droplets. To this end, the precoat material is constantly fluidized and cyclically swirled. The base of the funnel in which the precoat material is fluidized consists of an air-permeable material, usually sintered polyethylene. Larger quantities of liquid paint cannot be picked up, i.e. detached immediately from the fluidized bed, so they reach the fluid base and clog its pores. A more precise description of a dry separation system is disclosed e.g. in WO 2009/026995 A1 and corresponding U.S. Pat. Pub. No. 2011/0262324 A1.

Possible puddling on horizontal surfaces, which overflow at a certain extent, are disadvantageous.

A further problem is that unatomized material can get into the wash-out e.g. during rinsing processes or checking the outflow (volumetric measurement: German: "Auslitern").

The overspray may be bonded in the fluidized bed, although to a lesser extent; the larger portion is bonded to the filter pipes. E.g. the rock meal is cyclically brought out of the fluidized bed into the air in the region of the filter case, sucked in by the filter pipes and then the overspray is separated there.

In any case, however, the fluid base in particular is damaged by larger quantities of paint which flow into the fluidized bed (instead of being introduced as overspray particles), but not the filters.

FIG. 1 shows a schematic representation of a prior art disposal system. The disposal system is used to enrich wet wash-out proportionately with paint and solvents. The disposal system has two containers B1 and B2. The disposal agent E1 from the rinsing and/or cleaning processes of the atomizer Z is introduced into an open, mostly funnel-shaped first container B1, whereas the disposal agent E2 from the rinsing and/or cleaning processes of the colour changer or return line RL is introduced into a closed second container B2 with a de-aeration means EL. Both containers B1 and B2 are attached to a discharge line AL, which is usually arranged parallel to a painting line and is routed with a slope of approx. 1-2%. Generally, 15-20% of the discharge line AL is filled with disposal agent E1, E2. The disposal agent E1, E2 is conveyed by the discharge line AL to a collection tank ST. In order that the disposal agent E1, E2, in particular the solids thereof, do not deposit rapidly in the discharge line AL, the disposal agent E1, E2 is conveyed back continuously out of the collection tank ST to the start of the discharge line AL via a circulation line ZL with the aid of a circulation pump ZP. Due to the circulation of at least some of the disposal agent E1, E2 which has already been conducted out of the containers B1, B2 and intermediately stored in the collection tank ST, the volumetric flow increases independently of the disposal agent E1, E2 being produced.

If the above-described system is loaded with a two-component or more-component paint, there is in particular a risk that the two-component or more-component paint disadvantageously deposits or sets on the system components, in particular on or in the containers, in the lines or other sections, which come into contact with the two-component or more-component paint.

Although the lines affected by deposited two-component or more-component paint could for example be cleaned or replaced at regular intervals, the considerable outlay on personnel and costs entailed would be disadvantageous. Furthermore, there is a risk that, if the cleaning or replacement is carried out too late, lines become blocked in such a manner that an operating failure or damage to certain system components occurs, which is a further essential disadvantage.

It is further disadvantageous that the two-component or more-component paint can deposit or set on or in other coating installation components such as the application apparatus, the application robots etc.

Furthermore, the requirement for two separate containers for disposal agent from the rinsing and/or cleaning processes of an atomizer and disposal agent from the rinsing and/or cleaning processes of a colour changer or a return line is disadvantageous.

DE 42 11 465 C2, WO 2008/077944 A1 and corresponding U.S. Pat. Pub. No. 2010/0092733 A1, and U.S. Pat. No. 4,017,438 A disclose further technological background relating to the present disclosure.

Accordingly, there is a need in the art for solutions to the above described problems.

There is, for example, a requirement to solve the problem of the deposits of disposal agent and/or of two-component or more-component paint on parts, which come into contact with the disposal agent and/or the two-component or more-component paint. Undesirable deposits can occur in particular on or in a receiving device for the disposal agent, on or in coating installation components (e.g. components of a coating installation for motor vehicle body parts, for example), on or in application apparatuses (e.g. comprising atomizers, colour changers, mixers, valves, bell cups etc.) and on or in components of the disposal system (e.g. pumps, valves, lines etc.). The problem of the deposits exists in particular when two-component or more/more-component paints are used, i.e. paints, which have at least one paint component and at least one hardener component and are usually mixed in predefined ratios shortly before application and then usually harden rapidly.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

Figure 1:
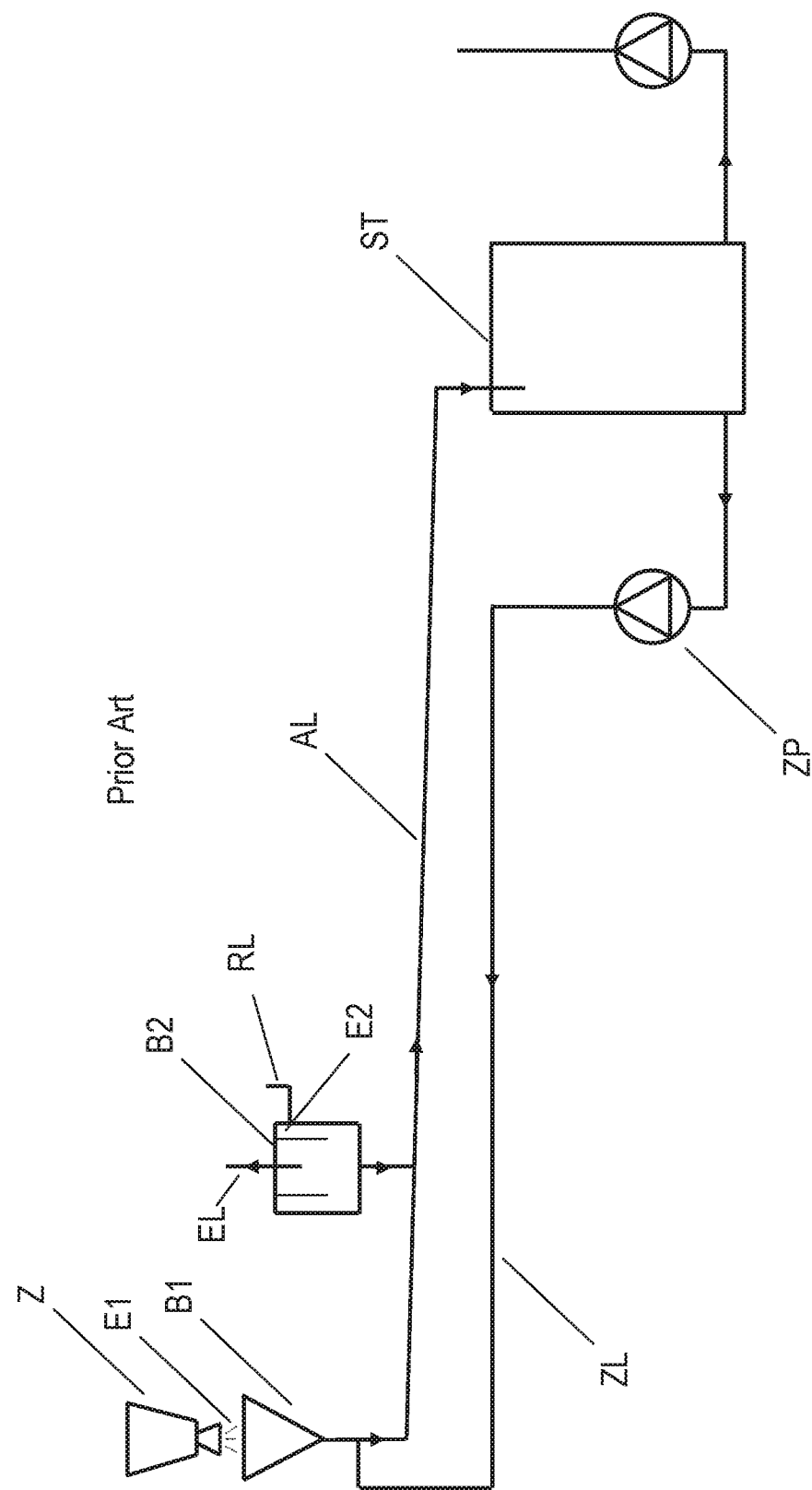
FIG. 1 a schematic representation of a prior art disposal system.

The exemplary illustrations may be used, for example, in the context of a coating installation such as a painting installation for motor vehicle body parts, and/or for disposal agents from cleaning and/or rinsing processes of an application apparatus comprising e.g. an atomizer, a colour changer, a return line or other application technology components. The exemplary illustrations may be used for a multi-component paint system, e.g., directed to application of a paint having two or more components, and may be referred to herein as a two-component or more-component paint system.

The exemplary illustrations comprises the general technical teaching of at least delaying, and in some cases essentially preventing deposition or setting of a disposal agent and/or of a two-component or more/multi-component paint on or in components of a coating installation, such as a painting installation for motor vehicle body parts.

The objects arising from that discussed above can in particular be achieved by a receiving device for disposal agents, in particular for disposal agents from cleaning and/or rinsing processes of an application apparatus, comprising for example an atomizer, a colour changer and a return line. The receiving device comprises at least one inlet opening to introduce the disposal agent, an outlet opening to discharge the disposal agent, and at least one loading means, which is provided to load the receiving device with a loading agent, which at least delays, and may in some cases essentially prevent deposition of disposal agent on or in the receiving device. All application technology components, which are subjected to cleaning and/or rinsing processes come into consideration as application apparatuses, in particular atomizers, colour changers and lines to be rinsed.

The disposal agent is usually a mixture of coating agents such as paint, e.g. a single-component paint, but in particular a two-component or more-component paint system, rinsing agent, cleaning agents solvent and/or other agents produced during cleaning and/or rinsing processes of application apparatuses. The disposal agent can, however, also be an essentially pure single component, two-component or more-component paint.

Deposition or setting on or in the receiving device is at least delayed, and in some cases essentially prevented by loading the receiving device with the loading agent.

The delay in deposition can in particular be achieved chemically and/or mechanically. In the case of a chemical delay in deposition, deposition-delaying agents such as solvents are used. Furthermore, a blocking agent can be used, in particular if the disposal agent comprises a two-component or more-component paint, to delay, and in some cases essentially prevent the two-component or more-component paint system from hardening. The blocking agent described below in particular comes into consideration as the blocking agent. The mechanical delay in deposition is achieved in particular in that the loading agent is supplied continuously or cyclically to the receiving device, so that the disposal agent introduced via the inlet opening is continuously or cyclically removed from the receiving device by means of the loading agent. Owing to the continuous or cyclic supply of the loading agent, deposition or setting of disposal agent on or in the receiving device is at least delayed, and in some cases is essentially prevented.

The effectiveness of the delay in deposition can for example be controlled by the pressure at which the loading agent meets the receiving device, the angle of impact at which the loading agent meets the receiving device, the quantity of loading agent, which is supplied to the receiving device, the time intervals of the loading (cyclic or continuous) and the composition of the loading agent.

In one exemplary approach, the at least one loading means is provided to be coupled to an application apparatus, an atomizer, e.g., a rotary atomizer, a colour changer, a return line, a circulation line of a disposal system, a rinsing agent, cleaning agent or solvent supply and/or a supply for blocking agent, which at least delays, and in some cases essentially prevents hardening of the disposal agent (e.g. comprising a two-component or more-component paint) in order to be supplied with loading agent and/or disposal agent. The coupling can be made directly or via lines, hoses etc.

Although the at least one loading means may be provided to conduct loading agent (e.g. solvent) into the receiving device, it is also possible for the at least one loading means to be provided in order to conduct disposal agent (e.g. mixture of paint and pulsed air) into the receiving device.

The disposal agent is usually conducted out of the application apparatus either via a return line or via the actual coating agent outlet opening to coat a part, depending on the sections of an application apparatus to be cleaned (e.g. an atomizer and a colour changer). As shown in FIG. 1, the disposal agent is usually conducted out of the coating agent outlet opening into the container B1, whereas the disposal agent is conducted out of the colour changer via the return line into the container B2.

In contrast to the prior art, the receiving device of the exemplary illustrations makes it possible for both disposal agent from the rinsing and/or cleaning processes of an atomizer and disposal agent from the rinsing and/or cleaning processes of a colour changer and/or a return line to be received in an advantageous manner. Thus, there is no longer a requirement for two separate receiving containers to be provided for disposal agent from the rinsing and/or cleaning processes of the atomizer and disposal agent from the rinsing and/or cleaning processes of the colour changer and/or the return line.

The receiving device advantageously combines the functions of collecting and receiving the disposal agent in the form of spray (mixtures of material, solvents, pulsed air during loading, colour-changing or rinsing processes), separation and discharging the air and the disposal agent (usually a paint/solvent mixture). Thus, the receiving device can be referred to as a combination receiving device for disposal agents from an atomizer and a colour changer.

The loading agent can be a pure or impure rinsing agent, cleaning agent and/or solvent, a pure or impure blocking agent to at least delay, and in some cases may essentially prevent hardening of the disposal agent, in particular comprising a two-component or more-component paint system, and/or disposal agent, e.g., already discharged disposal agent.

Already discharged disposal agent means a disposal agent, which has already been discharged from the collection device and conducted back to the collection device, in particular to the at least one loading means, via a corresponding line system. The advantage of recycling into the receiving device is that already discharged disposal agent can be used to prevent disposal agent introduced into the receiving device via the at least one inlet opening from depositing on the collection device.

The receiving device may comprise a cylindrical or funnel-shaped first body, on which, for example, an inlet opening is arranged, a cylindrical or funnel-shaped second body, on which the outlet opening may be arranged, and/or a cylindrical or funnel-shaped third body.

In one example, the at least one inlet opening is provided to introduce the disposal agent into the first body. It is also possible to provide the at least one inlet opening to introduce the disposal agent into an intermediate space between the second body and the third body. Thanks to the provision of the at least one inlet opening on the first body and/or between the second body and the third body, it is possible in a simple manner to receive resp. collect atomized disposal agent.

The at least one inlet opening may be formed in an essentially circular or annular gap-shaped manner.

In one exemplary illustration, the third body has a larger diameter than the first body. The second body may have a diameter which is larger at least in section than the diameter of the third body and/or of the first body. It is possible for the third body to surround the first body at least partially in order to form an intermediate space between the third body and the first body. The second body may surround the third body at least partially in order to form an intermediate space between the second body and the third body. The first body and the second body may be spaced apart from each other in order to form an intermediate space between the first body and the second body, and the second body and the third body likewise may be spaced apart from each other to form an intermediate space between the second body and the third body.

Thus, the first body may be an inner tube or inner funnel, the second body is an outer tube or outer funnel, and the third body is an intermediate tube or intermediate funnel, positioned between the first body and the second body.

The high dynamics due to the quantity of air in combination with the extremely finely atomized media are problematic when collecting atomized media. The atomized media are separated on the inner walls by the inner tube (first body). The air flow is conducted through the outer tube (second body) and partially calmed. The medium runs in relatively large drops from the inner tube (first body) into the funnel (second body) or is conveyed as relatively large drops by the air flow in the direction of the funnel (second body). The air can escape through the gap between the funnel (second body) and the intermediate tube (third body), so only small quantities of medium are entrained, and in some cases no medium is entrained. The de-aeration means may be spatially separate from the receptacle for the application apparatus, e.g., an atomizer, so that no medium bounces back onto the atomizer or is conveyed back onto the atomizer.

The intermediate space between the second body and the third body may be dimensioned to ensure sufficient de-aeration of the air introduced with the disposal agent and/or loading agent. The intermediate space between the second body and the third body can furthermore be dimensioned to be able to collect most, and in some cases essentially 100%, of the disposal agent and/or the loading agent. In some exemplary illustrations, the intermediate space (annular gap) between the second body and the third body may be between 50 mm and 400 mm, in some examples between 100 mm and 300 mm, and in other examples approximately 200 mm wide. Therefore, in some exemplary illustrations the second body may surround the third body to form a radial intermediate space therebetween of between 50 mm and 400 mm, in some examples between 100 mm and 300 mm, and in further examples may be approximately 200 mm.

In one exemplary illustration, the at least one inlet opening, the outlet opening, the first body, the second body and/or the third body are arranged essentially coaxially with respect to each other.

In a further example, the first body is arranged on a first end section of the receiving device, e.g., on an upper end section of the receiving device, the second body being, for example, arranged on a second end section of the receiving device, such as on a lower end section of the receiving device, the third body being, for example, arranged at least partially between the first end section of the receiving device and the second end section of the receiving device. Thus, the first body and the second body may be arranged on opposite sides of the receiving device. Therefore, the receiving device may be provided in such a manner that the disposal agent which is introduced via the at least one inlet opening passes at least partially by gravity from the at least one inlet opening to the outlet opening.

The at least one loading means may be configured and arranged in such a manner that the loading agent loads the sections of the second body and third body with the loading agent, which come into contact with disposal agent, which is introduced via the at least one inlet opening. For example, the loading agent can load an inner surface of the third body, an outer surface of the third body and/or an inner surface of the second body. It is possible for the loading agent to be introduced into the intermediate space between the first body and the third body and/or for the loading agent to be introduced into the intermediate space between the second body and the third body.

The at least one loading means can be configured and arranged to apply the loading agent and/or the disposal agent essentially parallel to the surfaces of the receiving device, which are to be loaded with loading agent and/or disposal agent. Here, essentially parallel includes angles less than or equal to 10° or less than 5°. The loading agent and/or the disposal agent can, however, also be applied obliquely to the surfaces to be loaded with loading agent and/or disposal agent. In this case, oblique includes angles greater than 10°, greater than 20°, greater than 45°, greater than 60° up to and including 90° and more. The surfaces to be loaded with loading agent are especially the inner surface of the second body and/or the inner and/or outer surfaces of the third body. The surfaces to be loaded with disposal agent are especially the inner surface of the first body, the inner surface of the second body and/or the inner and/or outer surfaces of the third body. Furthermore, the loading agent and/or the disposal agent can be applied essentially tangentially to the third body, e.g., essentially tangentially to the outer surface thereof.

In one exemplary illustration, the at least one loading means is configured and arranged to introduce the loading agent and/or the disposal agent into the receiving device in such a manner that cyclone separation of the disposal agent is achieved. In particular, the loading agent and/or the disposal agent can be introduced into the receiving device essentially in the circumferential direction, e.g., into the intermediate space between the second body and the third body. The introduction can also take place essentially tangentially to the third body, e.g., essentially tangentially to the outer surface thereof. The inner surface of the second body and/or the outer surface of the third body may act as a baffle plate for the loading agent and/or the disposal agent to separate the liquid fractions and the air fractions of the disposal agent from each other. Disposal agent from the rinsing and/or cleaning processes of a colour changer and/or return lines may be subjected to cyclone separation.

The at least one loading means can be positioned, for example, at an end section of the third body, such as an upper end section of the third body, at an end section of the second body, such as an upper end section of the second body, in the intermediate space between the first body and the third body, and/or in the intermediate space between the second body and the third body.

It is possible for a first end section of the receiving device, e.g., an upper end section, to be provided in such a manner that the receiving device can be coupled to a cleaning apparatus for cleaning an application apparatus. In particular, the third body can be provided to be coupled to the cleaning apparatus. To this end, the third body can be provided with a collar. The cleaning apparatus according to DE 10 2004 061 322 A1 and/or the cleaning device according to DE 102 40 073 A1 come into consideration as the cleaning apparatus, the content of which documents is fully incorporated in the present description.

In the exemplary illustration in which a cleaning apparatus is coupled to the receiving device, a section of an application apparatus to be cleaned (e.g. a spray head) is positioned in the cleaning apparatus and cleaned, the disposal agent of the application apparatus either being introduced into the at least one inlet opening of the receiving device or conducted into the receiving device via a discharge means of the cleaning apparatus (e.g. an intermediate tube of the cleaning apparatus). It is, however, also possible for the disposal agent to be introduced directly into the at least one inlet opening of the receiving device.

A plurality of loading means may be provided.

In one example, the plurality of loading means, the first body, the second body and/or the third body form an essentially rotationally symmetrical apparatus.

In another exemplary illustration, a receiving device for disposal agent, in particular for disposal agent from cleaning and/or rinsing processes of an application apparatus, is provided, comprising an inlet opening to introduce the disposal agent, an outlet opening to discharge the disposal agent, and a dry binder material and/or a filter fleece to bind the disposal agent, in particular a two-component or more-component paint system, physically. In this example, the inlet opening for introducing the disposal agent and the outlet opening for discharging the disposal agent can be the same opening, i.e. the bonded disposal agent is discharged via the same opening via which the disposal agent was introduced into the receiving device. It is, however, also possible for the inlet opening and the outlet opening to be two separate openings. Agents with a large absorptive capacity (with a large internal surface area) come into consideration as the dry binder material.

It is possible for the receiving device to be positioned below a grating and/or below a grating level of a disposal system, in particular a disposal system for a coating installation for motor vehicle body parts, e.g., within range of a painting robot.

As already mentioned above, the receiving device may be provided for receiving disposal agent from the rinsing and/or cleaning processes of an atomizer and of a colour changer and/or return system.

A further problem which can arise with a receiving device and is solved according to the exemplary illustrations, arises due to the fact that flammable spray forms in the interior, particularly in the case of coating, cleaning and/or rinsing agents containing organic solvents, so that no electrical flashovers resulting in sparks are permissible (risk of explosion). This hazard exists e.g. when cleaning electrostatic atomizers, which are known to be connected to a high-voltage supply of around 100 kV for contact charging of the coating material sprayed, for example by the bell cup or for external charging by external electrodes. Customary receiving devices are usually at earth potential, so before an application apparatus, e.g. an atomizer, is inserted the high voltage supply thereof must first be switched off and disconnected, for which a loss of time of typically around one minute must be taken into account.

With the receiving device, the risk of explosion triggered by sparks can be avoided if, before cleaning is started or while the application apparatus is being moved towards the receiving device and in some cases before the application apparatus is inserted into the receiving device, the charging device of the application apparatus is placed at the electrical potential of the receiving device or the receiving device is placed at the electrical potential of the charging device.

The receiving device may be placed under high tension, for example, at least when the atomizer approaches, if it has appropriate electrical insulation and is fitted or located at a sufficient distance from all the earthed parts of the coating system. If the associated space requirement and the concomitant increase in the total electrical capacitance of the system are to be avoided in other cases, it may be more expedient to earth the application apparatus, e.g. an atomizer, when and/or before it is inserted into the receiving device. This aspect is based upon the finding that a rapid reduction in the high-voltage potential of the charging device of the atomizer, typically in the order of milliseconds, is sufficient for equalizing potential, so that the loss of time associated with switching off the high-voltage generator and the complete reduction in voltage are avoided, and cleaning may take place with hardly any hesitation after a coating process, and coating can then recommence immediately.

There are various possibilities of earthing the application apparatus, such as an atomizer, rapidly. For example, the charging device of the atomizer may be earthed by an automatically controlled switch connected to the charging device. Instead, or in addition, the atomizer can be earthed by the receiving device itself. In particular, the atomizer may be brought to an earthed contact arrangement of the receiving device by the coating machine, e.g. a painting robot or a handling machine provided to introduce the atomizer into the receiving device, with which the charging device of the atomizer is brought into contact.

It is further possible to generate an alarm signal and/or to bring the handling machine to a standstill if the application apparatus, such as an atomizer, is approaching the receiving device from a direction which is different from the direction predefined by the movement control program of the machine. In particular, a limited range of movement of the atomizer may be specified by a particular control program for the handling machine bringing the atomizer to the receiving device in the vicinity of the receiving device in a way known per se, said range of movement being blocked by the control program for the movement of the atomizer if it approaches from any direction other than that specified. These measures firstly guarantee that the atomizer will always be introduced into the device correctly, without the danger of collision with the receiving device. The advantage also emerges that the atomizer must pass a proximity sensor provided therefor on its specified movement path while its approach to the receiving device is monitored to introduce reliable potential equalization at the right time, increasing the security of protection against explosion.

The high-voltage supply could per se be switched off first, after a coating process, to avoid voltage flashovers. However, in some cases it would be impractical to switch off the high-voltage generator of the application apparatus, e.g. an atomizer, completely first, i.e. including its own power supply, before the receiving device is approached following a coating process, because reducing the voltage and the restoration process necessary after cleaning may take an undesirably long time, entailing corresponding delays in production. There are different possibilities for equalizing potential in such cases.

A first possibility consists of the electrical isolation of the receiving device and charging it up to the high-voltage potential of the electric atomizer, e.g. by connecting it to the high-voltage generator of the atomizer in parallel to the atomizer, wherein switchgear may be provided, by means of which this parallel circuit may alternate between high voltage potential and earth.

In contrast, if the receiving device is to be permanently earthed, the atomizer is also earthed, for which different possibilities also exist, all of which entail no or only minimal loss of time. One simple possibility is a circuit in which a program-controlled earthing switch is connected between the high-voltage generator and the charging device (electrodes) of the atomizer, by means of which switch the atomizer is disconnected from the high-voltage generator and placed at earth potential before it reaches the earthed receiving device. The earthing switch may be located inside or outside the handling machine or atomizer. Although it is expedient for the earthing circuit to contain a resistance known per se or other attenuation devices, the atomizer can be discharged in an extremely short time by the earthing switch. Such more or less attenuated discharge may take place during the period in which the atomizer is being moved towards the receiving device, depending upon the conditions.

To avoid a safety risk, the time at which the application device, e.g. an atomizer, is earthed (or the potential equalized by charging the receiving device) may be controlled as a function of the approach of the atomizer to the receiving device. As the approach speed is known, because it is specified by the robot control program, a sufficient safe distance from the receiving device may be specified on the movement path of the atomizer, within which earthing or potential equalization may be commenced when the distance becomes less than the specified safe distance. Reaching the safety limit can be monitored and indicated by a proximity sensor, e.g. in the form of a light barrier, a laser sensing device or the like. The safety margin within which earthing or potential equalization must be commenced may be calculated from the known air insulation gap between the high-voltage potential and earth plus the distance covered by the atomizer in the time required to activate the proximity sensor and for recharging, i.e., for example, in the case of earthing, to activate an earthing switch and for the subsequent rapid discharge of the atomizer.

In one alternative possibility of earthing an application apparatus such as an atomizer with an earthing switch, the atomizer can remain connected to the high-voltage generator turned on with which the earthing switch is in parallel, during earthing. Expedient control measures can render switching off the high-voltage generator unnecessary because of this short-circuit.

The two above-described possibilities can also be changed or added to in that instead of or in addition to the earthing switch, the earthed receiving device itself makes contact with the electrode and charging device of the atomizer and thereby earths it when it comes close. For example, the high-voltage potential at the atomizer may be reduced in the shortest possible time by the atomizer touching an earthed contact array of the receiving device when it reaches its final position in the receiving device or during its introductory movement, which may also involve a plurality of contact elements, such as an earthed flexible curtain of individual conductors through which the atomizer passes in its introductory movement.

The application apparatus, e.g. the atomizer, could also be earthed without an earthing switch and without direct contact with earth. Before the atomizer reaches the receiving device, the output voltage of the high-voltage generator is reduced to at least approaching zero by automatically controlled reduction of its voltage setting or e.g. by the voltage setting specified by the system control program, without switching off the high-voltage generator in this variant. The high-voltage potential at the atomizer is then very quickly reduced by a resistance to earth in parallel to the high-voltage generator, e.g., during the approach movement of the atomizer.

It may also be expedient to reduce the output voltage of the high-voltage generator in advance, in the way explained, in the other earthing possibilities described above too, e.g. in the case of earthing by the receiving device itself.

In principle, there is thus the possibility of connecting the receiving device to an electrical earthing lead and providing it with a contacting arrangement for earthing the application apparatus which is inserted or is to be inserted, such as an electrostatic atomizer with direct/external charging, in order to prevent a risk of explosion due to sparks caused by flashovers. The receiving device can further be connected or connectable to an electrical high-voltage line with which it is placed at the high voltage potential of an application apparatus such as an electrostatic atomizer with direct/external charging. The equalization of potential is in particular carried out while the application apparatus is approaching the receiving device or at least before the application apparatus is introduced into the receiving device. It is possible in this case for a charging device for coating agents of the application apparatus, which charging device is connected to a high-voltage generator, to be earthed while the application apparatus is moved towards or into the receiving device or is in the receiving device and for the high-voltage generator to remain switched on during earthing. Before or during grounding with the high-voltage generator switched on, its output voltage can be reduced to zero or to a low level, by reducing the voltage setting. In particular, the charging device of the application apparatus can be earthed by means of a connected automatically controlled switch before cleaning starts. Furthermore, the application apparatus can be earthed by the receiving device. It is further possible for the application apparatus to be brought towards an earthed contacting arrangement of the receiving device, to which the charging device of the application apparatus is electrically connected, by the coating machine or the handling machine. It is also possible to provide a proximity sensor, which monitors the proximity of the application apparatus to the receiving device. The proximity sensor is in particular provided to generate a signal as soon as the application apparatus is less than a certain safe distance away from the receiving device on its path towards the receiving device, which distance is determined as a function of the minimum air gap necessary for electrical isolation between the high-voltage potential of the application apparatus and earth potential, and of the path which the application apparatus covers during the period required for the signal from the proximity sensor and for earthing or potential equalization.

The "switch-off" is provided in particular for application apparatuss such as electrostatic atomizers with direct and/or external charging of coating agents.

The receiving device described herein is in particular provided and suitable for application apparatuses such as atomizers, rotary atomizers, air atomizers, electrostatic atomizers for internal, direct, ionization and/or external charging, atomizers with or without external electrodes etc.

The objects arising from that discussed above can further be achieved in particular by a method for receiving disposal agent, in particular disposal agent from cleaning and/or rinsing processes of an application apparatus (e.g. an atomizer, a colour changer, a return line, etc.), comprising introduction of the disposal agent into a receiving device, e.g., into a receiving device as described above, and discharging the disposal agent from the receiving device, at least one loading means loading the receiving device with a loading agent, which delays, and in some cases essentially prevents deposition of disposal agent in the receiving device.

The at least one loading means may be supplied with loading agent and/or disposal agent by an application apparatus, an atomizer, a colour changer, a return line, a circulation line of a disposal system, a supply for rinsing agent, cleaning agent and/or solvent and/or a supply for blocking agent, which at least delays hardening of disposal agent. Although the at least one loading means may be provided to conduct loading agent (e.g. solvent) into the receiving device, it is also possible for the at least one loading means to be provided in order to conduct disposal agent (e.g. mixture of paint and pulsed air) into the receiving device.

The loading agent can be a pure or impure rinsing agent, cleaning agent and/or solvent, a pure or impure blocking agent, which at least delays, and in some cases may essentially prevent hardening of disposal agent, e.g. comprising a two-component or more-component paint system, and/or disposal agent, such as already discharged disposal agent.

In one example, the disposal agent is introduced into the receiving device directly from an atomizer via the coating agent outlet opening thereof. It is further possible for the disposal agent to be introduced into the receiving device from a colour changer and/or return line.

It is possible to introduce the disposal agent into an inlet opening, which is provided on a cylindrical or funnel-shaped first body of the receiving device. It is also possible to introduce the disposal agent and/or the loading agent into an inlet opening, which is provided between a cylindrical or funnel-shaped second body and a cylindrical or funnel-shaped third body of the receiving device.

The loading agent may be introduced into the receiving device in such a manner that the sections of the receiving device, which come into contact with disposal agent, which is introduced via the at least one inlet opening are loaded with the loading agent. It is further possible to introduce the disposal agent and/or the loading agent into the receiving device in such a manner that cyclone separation of the disposal agent is achieved.

The objects arising from that discussed above can further be achieved in particular by a disposal system, in particular for disposal agents from cleaning and/or rinsing processes of an application apparatus, the disposal system having a receiving device for disposal agents, e.g., a receiving device as described above, and a circulation line. The circulation line is provided to feed loading agent into the receiving device to at least delay, and in some cases essentially to prevent deposition of disposal agent on or in the receiving device.

The circulation line may be provided to conduct at least some of the disposal agent already discharged from the receiving device back into the receiving device.

The loading agent can be a pure or impure rinsing agent, cleaning agent and/or solvent, a pure or impure blocking agent to at least delay, and in some cases essentially prevent hardening of the disposal agent, in particular comprising a two-component or more-component paint system, and/or disposal agent, e.g., already discharged disposal agent.

In an advantageous design, the disposal system comprises a discharge line, which conducts the disposal agent and/or the loading agent from the receiving device to a collection tank.

The discharge line can be arranged with a slope of less than approximately 1%.

In one exemplary disposal system, the receiving device can be positioned below a grating and/or below a grating level of the disposal system, in particular a disposal system for a coating installation for motor vehicle body parts, e.g., within range of a painting robot.

The objects arising from that discussed above can further be achieved in particular by an operating method for a disposal system, e.g., a disposal system as described above, wherein the operating method comprises conducting a disposal agent out of a receiving device, such as a receiving device as described above, and supplying a loading agent via a circulation line into the receiving device, in order to at least delay, and in some cases essentially prevent deposition of disposal agent on or in the receiving device.

It is possible to conduct the disposal agent discharged from the receiving device via a discharge line into a collection tank.

The circulation line may conduct at least some of the disposal agent which has already been discharged from the receiving device and intermediately stored in the collection tank back into the receiving device.

The loading agent can be a pure or impure rinsing agent, cleaning agent and/or solvent, a pure or impure blocking agent to at least delay, and in some cases essentially prevent hardening of the disposal agent, in particular comprising a two-component or multi-component paint system, and/or disposal agent, e.g., already discharged disposal agent.

The loading agent can be supplied continuously or cyclically to the receiving device in order to at least delay, and in some cases essentially prevent deposition of disposal agent on or in the receiving device and/or in the discharge line and/or in the circulation line.

The objects arising from that discussed above can further be achieved in particular by a composition comprising a two-component paint system or a more-component paint system and a blocking agent, which at least delays, and in some cases may essentially prevent hardening of the two-component paint system or more-component paint system in order to at least delay, or even may essentially prevent deposition on or in coating installation components.

All monofunctional molecules, which can react with at least one component of a two-component or more-component paint system come into consideration as the blocking agent. The blocking agent may comprise at least one amine, at least one alcohol, e.g., at least one lower alcohol, ethanol, propanol and/or at least one isomer thereof, and/or butanol and/or at least one isomer thereof. The blocking agent can also comprise a reactive agent such as at least one retarding agent, e.g., at least one organic acid chloride. The hardener component of the two-component or more-component paint system can be e.g. isocyanate. The two-component or more-component paint system can be a conventional two-component or more-component paint system, which is usually used for coating motor vehicle body parts.

The composition can further comprise a rinsing agent, cleaning agent and/or solvent. The blocking agent can, for example, be mixed with these agents. Otherwise the composition can comprise a solubilizer for mixing the blocking agent with the rinsing agent, cleaning agent and/or solvent. The rinsing agent, cleaning agent and/or solvents can be customary paint rinsing and paint cleaning agents and/or customary paint solvents.

It is possible for the blocking agent to be added in the form of monofunctional molecules to the rinsing agent, cleaning agent and/or solvent at a dosage of, for example, 10-50%.

It is further possible for the blocking agent to be added in the form of the reactive agent to the rinsing agent, cleaning agent and/or solvent at a dosage of, for example, 1-5%.

The blocking agent is in particular provided to react with a hardener component of the two-component or more-component paint system.

The objects arising from that discussed above can further be achieved in particular by the use of a blocking agent for reaction with at least one component of a two-component paint system or more-component paint system in order to at least delay, and in some cases essentially prevent hardening of the two-component paint system or more-component paint system, in particular in a coating installation for motor vehicle body parts, which at least delays, and may essentially prevent deposition on or in coating installation components.

The blocking agent can be monofunctional molecules, at least one amine, at least one alcohol, e.g., at least one lower alcohol, ethanol, propanol and/or at least one isomer thereof, and/or butanol and/or at least one isomer thereof. The blocking agent can, however, also be a reactive agent such as a retarding agent such as organic acid chloride. The hardener component of the two-component or more-component paint system can be e.g. isocyanate.

In one exemplary use, the blocking agent coats and/or fills and/or flows through a coating installation component, in particular a component of a painting installation for motor vehicle body parts, an application robot, an application apparatus, an atomizer, a bell cup, a mixer for mixing the two-component or more-component paint system, a cleaning apparatus for cleaning an application apparatus, a colour changer, a return line, a receiving device for disposal agent, a discharge line for discharging the disposal agent from the receiving device, a circulation line for returning disposal agent, which has already been discharged from the receiving device to the receiving device, and/or other parts of a coating installation, which are exposed to a risk of coming into contact with coating agent in the form of e.g. two-component or more-component paint, which can deposit or set in an undesirable manner.

The objects arising from that discussed above can further be achieved in particular by a coating installation component, in particular component of a coating installation for motor vehicle body parts, wherein the coating installation component has a blocking agent in order to at least delay, and may essentially prevent hardening of a two-component or more-component paint system, in particular in a coating installation for motor vehicle body parts, which at least delays, and in some cases may essentially prevent deposition on or in the coating installation component.

Although the coating installation component comes into contact with two-component or more-component paint in an undesirable manner, the risk of deposition or setting can be reduced or prevented by the blocking agent or the composition comprising the two-component or more-component paint and the blocking agent.

The blocking agent can in particular at least partially coat and/or fill and/or flow through the coating installation component. The blocking agent may be applied to the sections of the coating installation component, which are exposed to the risk of coming into contact with disposal agent, in particular a two-component or more-component paint.

The delay or prevention of deposition of disposal agent, in particular of two-component or more-component paints, results in a reduced outlay on maintenance or cleaning of the parts of a coating installation, which come into contact with the disposal agent (e.g. the application apparatus, atomizer, colour changer, return line, ring line etc.). The outlay on maintenance of the recycling or ring line can also be reduced e.g. during loading, colour change or rinsing.

The objects arising from that discussed above can further be achieved in particular by a coating installation for motor vehicle body parts, comprising a coating installation component, a supply for a two-component or more-component paint system to the coating installation component and a means for supplying blocking agent to the coating installation component and/or to the supply in order to at least delay hardening of the two-component or more-component paint system on or in the coating installation component and/or in the supply.

The means can comprise e.g. a container for the blocking agent or at least one line for supplying blocking agent from the container to the coating installation component and/or to the supply.

The coating installation component can in particular comprise one of the following: an application robot, an application apparatus, an atomizer, a bell cup, a mixer for mixing the two-component or more-component paint system, a cleaning apparatus for cleaning an application apparatus, a colour changer, a return line, a receiving device for disposal agent, a discharge line for discharging disposal agent from the receiving device, a circulation line for returning disposal agent, which has already been discharged from the receiving device to the receiving device.

A further advantage of the exemplary illustrations is the avoidance of additional chemical consumption and of increased occurrence of paint sludge when processing two-component or more-component paints in painting booths with wet wash-out.

In particular the above-described exemplary illustrations and possible designs of the collecting device, the method for receiving disposal agent, the disposal system, the operating method for the disposal system, the composition, the use, the coating installation and the coating installation component, may comprise a blocking agent that can be combined with each other in any desired manner.

Figure 2:
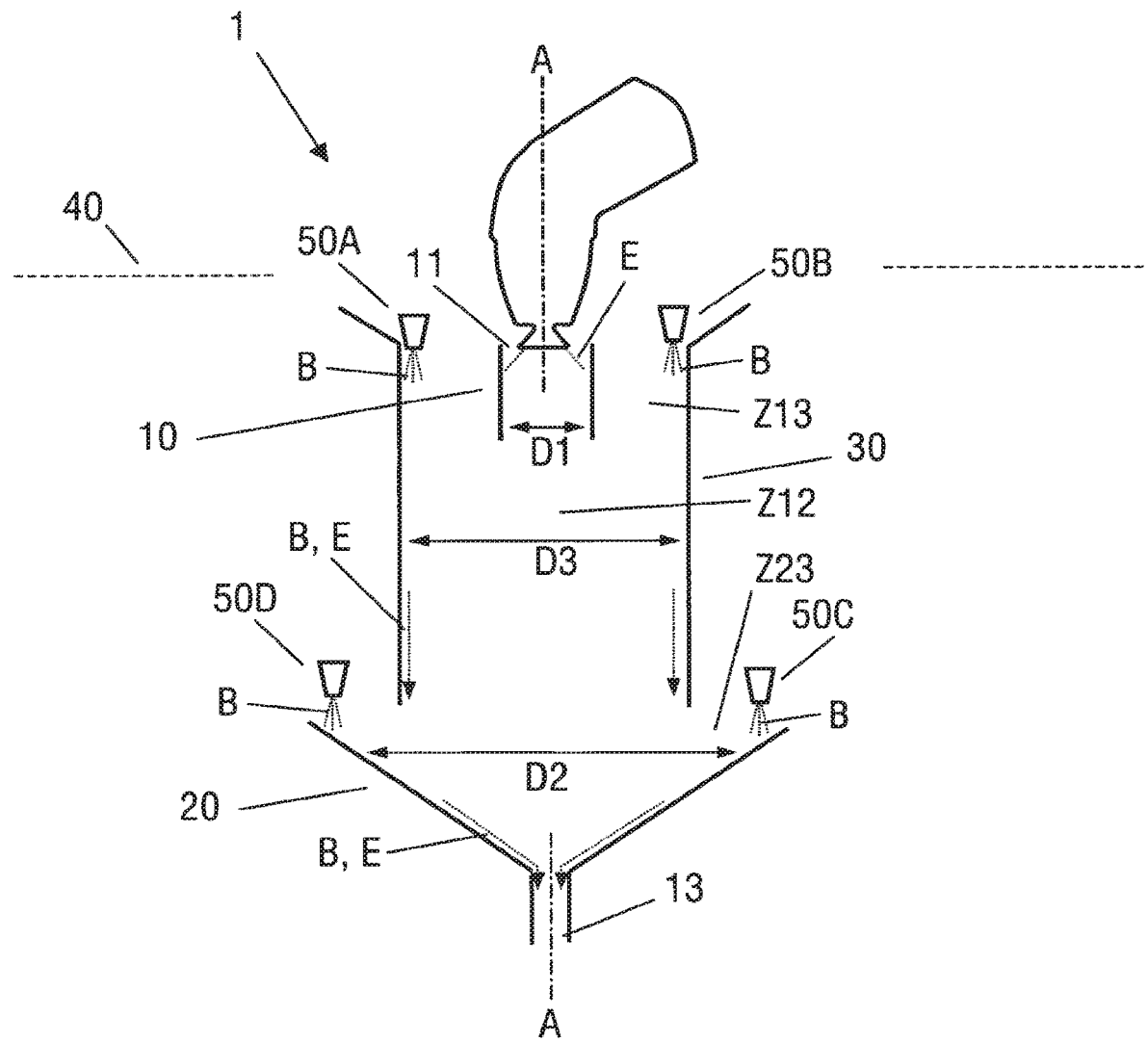
FIG. 2 a schematic side sectional view of a receiving device for disposal agent according to a first exemplary illustration.

FIG. 2 shows a schematic representation of a receiving device 1 for disposal agent E according to a first exemplary illustration. The receiving device 1 comprises a first body 10, a second body 20 and a third body 30. The first body 10 and the third body 30 are essentially cylindrical. The second body 20 is essentially funnel-shaped. The first body 10 may be fastened in a detachable manner to the upper end section of the third body 30. It is also possible for the first body 10 and the third body 30 to be funnel-shaped.

The third body 30 has a diameter D3 which is greater than the diameter D1 of the first body 10. The second body 20 has a diameter D2 which is greater than the diameter D1 of the first body 10 and/or of the diameter D3 of the third body 30, at least in sections. Owing to the funnel-shaped formation, the second body 20 also has diameters which are smaller than the diameter D1 of the first body 10 and/or of the diameter D3 of the third body 30. The first body 10, the second body 20 and the third body 30 are arranged around a longitudinal axis A-A and essentially coaxially to each other.

The third body 30 surrounds the first body 10 at least partially in order to form an intermediate space Z13 between the third body 30 and the first body 10. The second body 20 surrounds the third body 30 at least partially in order to form an intermediate space Z23 between the second body 20 and the third body 30. The intermediate space Z23 is provided to ensure adequate de-aeration of the guide air introduced together with the disposal agent via the inlet opening 11 (to prevent contamination e.g. of the atomizer). The intermediate space Z23 may be dimensioned to be sufficient for the de-aeration (no back pressure) but should not be too large to be able to collect, e.g., 100% of the disposal agent E and loading agent B. The intermediate space Z23 may, in one exemplary illustration, have a width of approximately 200 mm. Furthermore, the first body 10 and the second body 20 are spaced apart from each other in order to form an intermediate space Z12 between the first body 10 and the second body 20.

The first body 10 may thus be an inner tube, the second body 20 may be an outer tube and the third body 30 may be an intermediate tube, positioned between the outer tube 20 and the inner tube 10.

For example, arms (not shown) can extend from the first body 10 to the third body 30 in order to fasten the first body 10 to the third body 30, e.g., in a detachable manner.

An inlet opening 11, into which the agent E to be disposed of is to be introduced, is provided at the upper end section of the first body 10. In the present exemplary illustration, an application apparatus (e.g. an atomizer with a bell cup) of a robot arm is positioned at the inlet opening 11 or the first body 10 in order to spray the disposal agent E into the inlet opening 11 resp. the first body 10.

The disposal agent E, which usually comprises paint, solvent and air inclusions, is introduced into the first body 10 in an atomized form. The air can here escape upwards and/or downwards. The disposal agent E is separated on the inner surface of the third body 30 in the form of (relatively large) droplets and discharged downwards to the second body 20.

An outlet opening 13, via which the disposal agent E can be discharged from the receiving device 1, is provided at the lower end section of the second body 20.

The disposal agent E therefore passes from the first body 10 via the third body 30 to the second body 20 under gravity.

The receiving device 1 further comprises at least one loading means 50, and in one example a plurality of loading means 50A, 50B, 50C and 50D to load the receiving device 1 with a loading agent B, which at least delays, and in some cases substantially or essentially prevents deposition of disposal agent E on or in the receiving device 1.

The loading means 50A-50D are configured and arranged in such a manner that in particular the sections of the second body 20 and third body 30, which come into contact with disposal agent E, which is introduced via the inlet opening 11 are loaded with the loading agent B.

The loading means 50A and 50B are positioned at the upper end section of the third body 30 in order to load in particular the inner surface of the third body 30, which comes into contact with disposal agent E from the first body 10 with loading agent B.

The loading means 50C and 50D are positioned at the upper end section of the second body 20 in order to load in particular the inner surface of the second body 20, which comes into contact with disposal agent E from the first body 10 with loading agent B.

The loading means 50A and 50B can for example be coupled to a rinsing agent, cleaning agent and/or solvent supply (not represented), in order to load the receiving device 1 with loading agent B in the form of clean, uncontaminated rinsing agent, cleaning agent and/or solvent.

The loading means 50C and 50D can for example be coupled to a circulation line of a disposal system (not represented in FIG. 1). The circulation line is provided to feed at least some of the disposal agent E, which has already been discharged from the receiving device 1 and intermediately stored, usually in a collection tank (not represented in FIG. 1), back into the receiving device 1. The loading agent B supplied by the circulation line can comprise, in addition to the disposal agent E already discharged from the receiving device 1, further rinsing agent, cleaning agent and/or solvent, a blocking agent, which at least delays hardening of the disposal agent E, in particular if the disposal agent E has a two-component or more/multi-component paint, or other additional liquids.

Deposition of the disposal agent E introduced via the inlet opening 11 on or in the receiving device 1, in particular the inner surfaces of the second body 20 and third body 30, is at least delayed, and in some examples may be essentially prevented, as the disposal agent E introduced via the inlet opening 11 is ("mechanically") discharged from the inner surfaces of the second body 20 and third body 30 by the loading agent B. Deposition of the disposal agent E introduced via the inlet opening 11 on or in the receiving device 1, in particular the inner surfaces of the second body 20 and third body 30, can further be at least delayed, and in some cases may be essentially prevented if the loading agent B comprises an agent, which ("chemically") delays, or even essentially prevents, deposition or adhesion of the disposal agent E on or in the receiving device 1.

The receiving device 1 in FIG. 2 is arranged below a grating 40 and/or below a grating level of a disposal system, which is positioned in a coating installation for motor vehicle body parts and arranged within the range of a painting robot.

Figure 3:
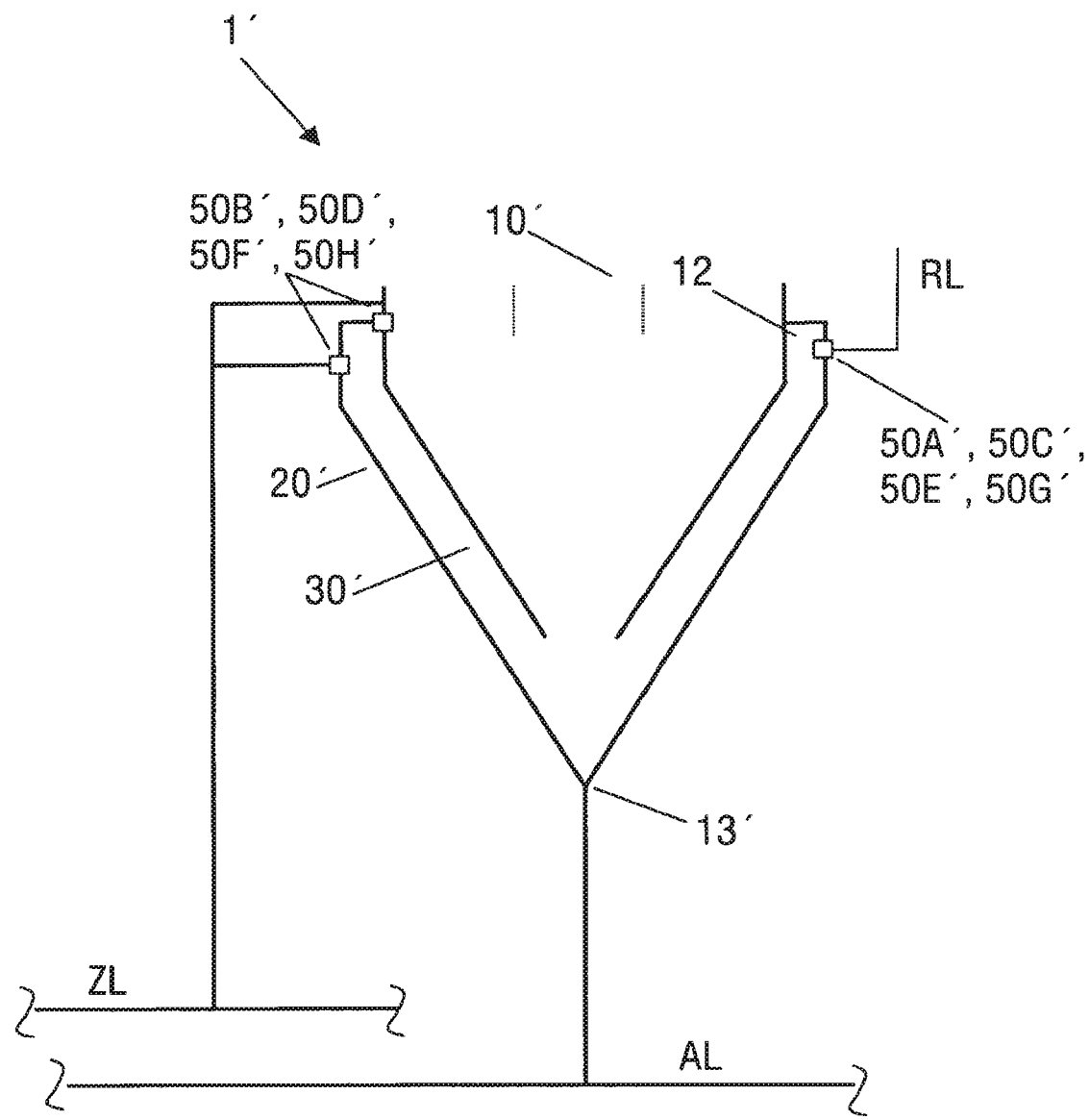
FIG. 3 a schematic side sectional view of a receiving device for disposal agent according to a second exemplary illustration.
Figure 4:
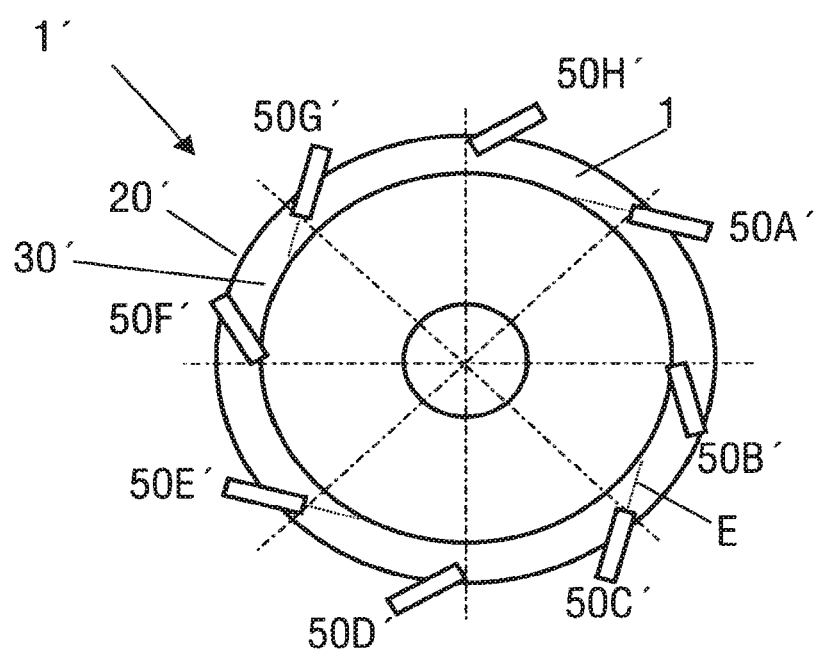
FIG. 4 a schematic plan view of the receiving device according to FIG. 3.

FIGS. 3 and 4 show a receiving device for disposal agent 1' according to a second exemplary illustration, FIG. 3 being a schematic sectional view and FIG. 4 being a schematic plan view of the receiving device 1'. Parts, which are identical or essentially identical to the first exemplary illustration have the same reference signs but with an apostrophe, so in this respect reference is made to the first exemplary illustration in order to avoid repetitions.

FIG. 3 shows a second body 20', a third body 30', an outlet opening 13' provided on the second body 20', a plurality of loading means 50A', 50B', 50C', 50D', 50E', 50F', 50G' and 50H', a discharge line AL, which leads to a collection tank (not represented), and a circulation line ZL, which leads from the collection tank to the receiving device 1'. FIG. 3 also shows an inlet opening 12, which is formed by an intermediate space between the second body 20 and the third body 30, the intermediate space being situated on an essentially upper end section of the receiving device 1'. The inlet opening 12 may be an annular gap opening.

FIG. 4 shows the second body 20', the third body 30', the inlet opening 12 and the plurality of loading means 50A', 50B', 50C', 50D', 50E', 50F', 50G' and 50H'.

The loading meanss 50A', 50C', 50E' and 50G' are coupled to a return line RL in order to be supplied with disposal agent E from an application apparatus. The loading means 50A', 50C', 50E' and 50G' are provided to introduce the disposal agent E into the inlet opening 12.

The loading meanss 50B', 50D', 50F' and 50H' are coupled to the circulation line ZL in order to be supplied with loading agent B. The loading meanss 50B', 50D', 50F' and 50H' are provided to introduce the loading agent B into the inlet opening 12.

The loading means 50A', 50C', 50E' and 50G' may be configured and arranged to introduce the disposal agent E into the receiving device 1' in such a manner that a cyclone separation of the disposal agent E is achieved. To achieve this, the disposal agent E is introduced into the receiving device 1' essentially in the circumferential direction, e.g., essentially tangentially to the outer surface of the third body 30, as can be seen in FIG. 4. The third body 30 acts as a baffle plate for the disposal agent E. The cyclone separation for example separates the liquid fractions from the air fractions. The liquid fractions and the remaining disposal agent E are supplied to the discharge line AL via the second body 20' and the outlet opening 13', whereas the air fractions may escape upwards.

The loading means 50B', 50D', 50F' and 50H' are provided to load the receiving device 1' with the loading agent B, which at least delays, and may even essentially prevent deposition of the disposal agent E on or in the receiving device 1', in particular the outer surface of the third body 30 and the inner surface of the second body 20.

The loading agent B from the circulation line ZL is for example dirty (e.g. due to paint constituents) rinsing agent, cleaning agent and/or solvent. It is also possible to provide a loading means, which introduces e.g. clean solvent and/or clean blocking agent into the inlet opening 12, in order to delay, or even essentially prevent deposition of disposal agent E.

The first and second exemplary illustration can be combined with each other. It is in particular possible to provide a first body according to the first exemplary illustration on the receiving device 1' of the second exemplary illustration, which is indicated by the first body 10' indicated with dashed lines in FIG. 3. The receiving device of this exemplary illustration then has two inlet openings for introducing disposal agent. It is possible to provide one inlet opening for disposal agent from e.g. an atomizer and the other inlet opening for disposal agent from e.g. a colour changer and/or a return line. Thus, this receiving device is capable of receiving both disposal agents from the rinsing and/or cleaning processes of an atomizer and of a colour changer and/or return lines.

It is further possible to replace the second body 20 according to FIG. 2 by the structure according to FIG. 3. In particular, the second body 20' and the third body 30' from the second exemplary illustration can replace the second body 20 from the first exemplary illustration.

It is further possible for the structure according to FIG. 3 to be cylindrical and to be combined with the structure according to FIG. 2 in that the third body 30 is double-walled and the media (e.g. from the colour changer, the return line etc.) are supplied here. Cyclone separation may be achieved in the double-walled version.

The above-described receiving device can be connected or connectable to an electrical earthing lead and provided with a contacting arrangement for earthing the application apparatus, which is inserted or is to be inserted, such as an electrostatic atomizer with direct/external charging, in order to prevent a risk of explosion due to sparks caused by flashovers. The above-described receiving devices can further be connected or connectable to an electrical high-voltage line with which they are placed at the high voltage potential of an application apparatus such as an electrostatic atomizer with direct/external charging.

A receiving device for disposal agent according to another exemplary illustration, which is not shown in the figures likewise comprises at least one inlet opening to introduce the disposal agent and an outlet opening to discharge the disposal agent, it being possible for the inlet and outlet openings to be the same opening or two separate openings. The receiving device of this exemplary illustration must generally, however, be provided with a dry binder material and/or a filter fleece to bind the disposal agent, in particular a two-component or more-component paint system, physically.

FIGS. 5A-5D schematically show a plurality of exemplary possibilities of introducing the loading agent B and/or the disposal agent E into the receiving device.

Figure 5A:
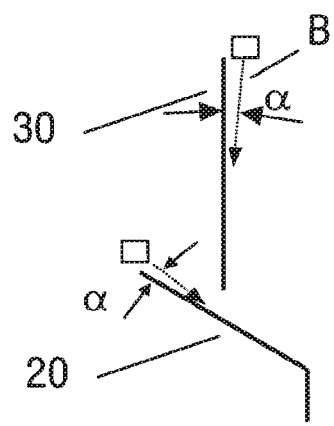
FIG. 5A-5D schematic representations of different possibilities of introducing loading agent into a receiving device for disposal agent, according to an exemplary illustration.

FIG. 5A shows a schematic sectional view of the second body 20, the third body 30 and by way of example two loading means, which are indicated by two squares. The loading means are provided in this exemplary illustration in such a manner that the loading agent B is supplied essentially parallel to the surfaces of the receiving device 1, which are to be loaded with loading agents B. Parallel essentially includes angles of impact α of less than or equal to approximately 10°.

Figure 5B:
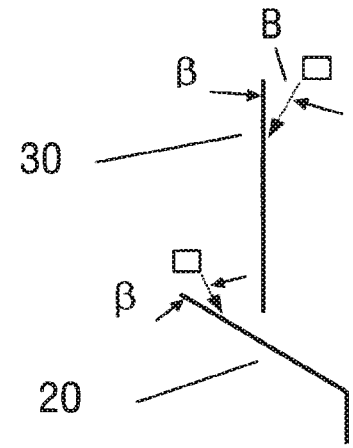

FIG. 5B shows a schematic sectional view of the second body 20, the third body 30 and by way of example two loading means, which are indicated by two squares. The loading means are provided in this exemplary illustration in such a manner that the loading agent B is supplied essentially obliquely to the surfaces of the receiving device 1, which are to be loaded with loading agent B. Oblique includes angles of impact β of approximately 10°, greater than 10°, greater than 20°, greater than 45°, greater than 60° to 90° and more.

Figure 5C:
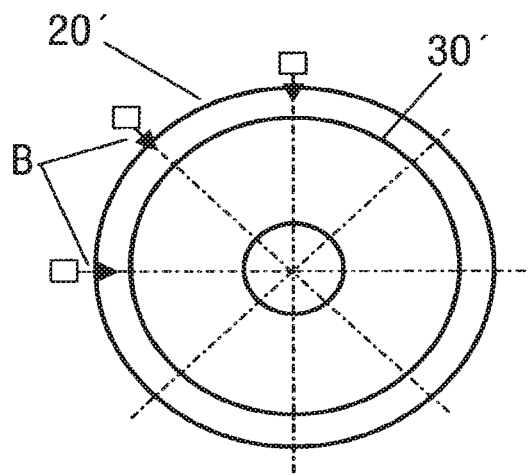

FIG. 5C shows a schematic plan view of the second body 20', the third body 30' and by way of example three loading means, which are indicated by three squares. The loading means are provided in this exemplary illustration in such a manner that the loading agent B is supplied in a manner essentially directed at the outlet opening.

Figure 5D:
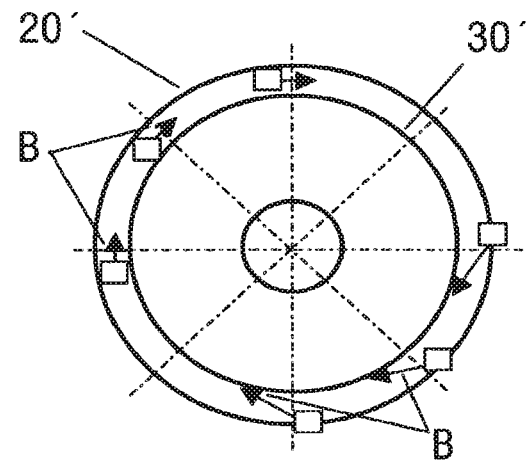

FIG. 5D shows a schematic plan view of the second body 20', the third body 30' and by way of example three loading means, which are indicated by three squares. The loading means are provided in this example in such a manner that the loading agent B (and/or the disposal agent E) is conducted into the receiving device essentially in the circumferential direction (see the three loading means in the top left in FIG. 5D) and/or is applied essentially tangentially to the outer surface of the third body (see the three loading means in the bottom right in FIG. 5D).

The possibilities of supplying the loading agent B and/or the disposal agent E into the receiving device described in FIGS. 5A to 5D can be combined with each other in any desired manner.

Figure 6:
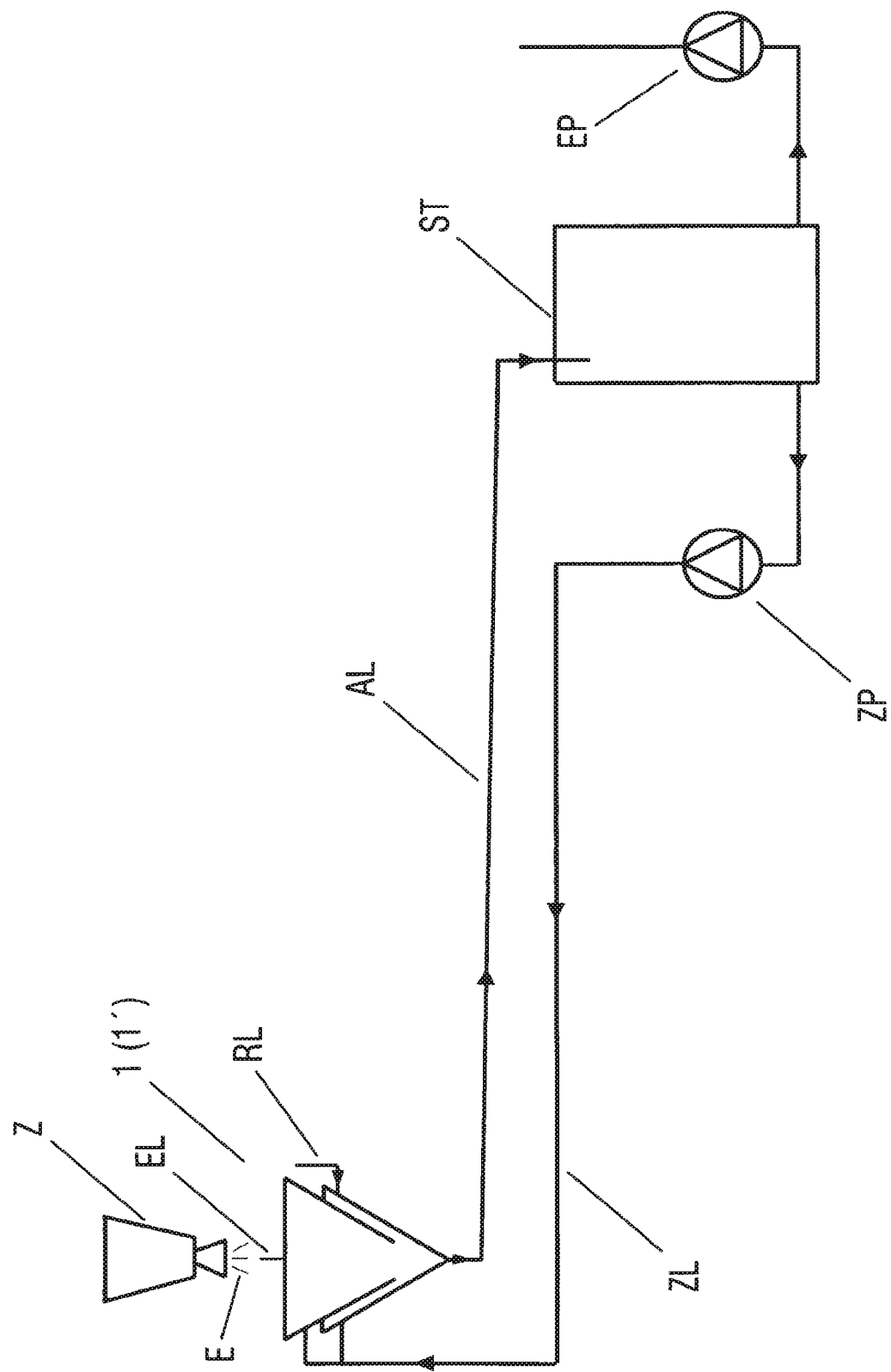
FIG. 6 a schematic representation of disposal system according to an exemplary illustration.

FIG. 6 shows a schematic representation of a disposal system, in particular for disposal agent E from cleaning and/or rinsing processes of an application apparatus, such as an atomizer Z and a colour changer and/or a return line RL.

The disposal system comprises a receiving device for disposal agent, such as a receiving device 1 or 1' as described above, and a circulation line ZL for feeding loading agent into the receiving device 1 (1') in order to at least delay, and in some cases essentially prevent, deposition of disposal agent E in particular on or in the receiving device 1 (1'). The reference sign EL indicates de-aeration of the receiving device 1 (1'), via which the e.g. air fractions of the disposal agent E can escape.

The disposal system further comprises a discharge line AL, which supplies the disposal agent E and/or loading agent discharged from the receiving device 1 (1') to a collection tank ST, in which the disposal agent E and/or the loading agent can be intermediately stored. The discharge line AL can be arranged with a slope of less than approximately 1%)(0.57°. The discharge line AL may run essentially parallel to a painting line and can be coupled to one or more receiving devices.

The disposal system also has a circulation pump ZP to conduct at least some of the disposal agent E and/or loading agent already discharged from the receiving device 1 (1') from the collection tank ST via the circulation line ZL back to the receiving device 1 (1').

The disposal system, in particular the discharge line AL, is loaded with additional liquid. For example, the discharge line AL can be approximately 85% filled with a mixture of additional liquid, disposal agent E and solvent. The mixture may mostly consist of additional liquid, e.g. approximately 80% of the mixture can consist of additional liquid.

As soon as the collection tank ST is full, the collection tank ST can either be conducted with the aid of a disposal pump EP into a further collection tank (not represented) or emptied into a transport container.

A blocking agent can also be used in the above-described exemplary illustrations. The use of a blocking agent may be advantageous in particular when the disposal agent comprises a two-component or more-component paint. The blocking agent is then used to at least delay, and in some cases may essentially prevent, hardening of the two-component or more-component paint system, which at least delays, and in some cases may essentially prevent deposition of disposal agent on or in the receiving device, on or in parts of the disposal system and/or on or in other parts of a coating installation.

Figure 7A:
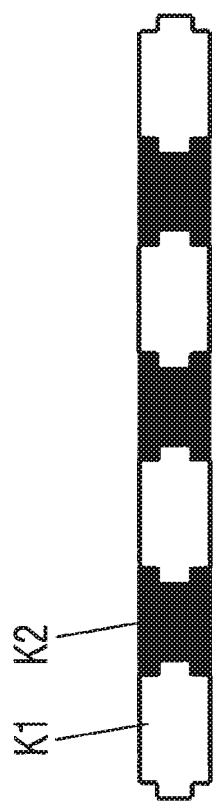
FIG. 7A-7C schematic representations of a composition and a blocking agent according to an exemplary illustration.
Figure 7B:
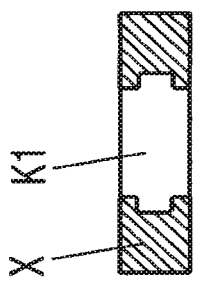
Figure 7C:
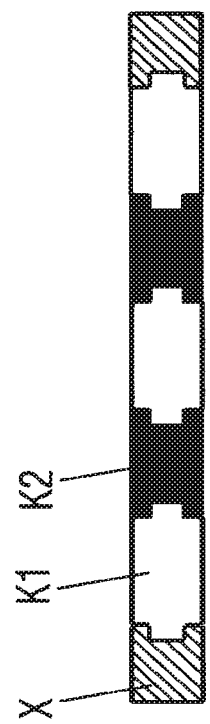

FIGS. 7A-7C relate to a blocking agent and a composition according to one exemplary illustration. In particular, FIGS. 7B and 7C show a composition according to one example, which comprises a blocking agent and a two-component or more/multi-component paint system. The two-component or more-component paint can be a conventional two-component or more-component paint, which is usually used for coating motor vehicle body parts.

FIG. 7A shows a section of a polymer chain consisting of two reactive components K1 and K2, wherein K1 indicates a hardener component and K2 indicates a paint component.

FIG. 7B schematically shows an example of a reaction blocking, wherein a blocking agent X reacts with the hardener component K1 to at least delay, and in some cases essentially prevent, hardening.

FIG. 7C schematically shows an example of a reaction blocking, wherein a blocking agent X acts as a chain stopper to at least delay, and in some cases may essentially prevent hardening.

The blocking agent X may be a reactive, monofunctional agent, which reacts with at least one component of a two-component or more-component paint, e.g., with the hardener component K1, but in the process does not result in polymer chains owing to its monofunctionality, but ideally in a molecule resp. oligomer consisting of a hardener molecule and two blocking agent molecules.

When the hardener component K1 and the paint component K2 are mixed, usually the reaction thereof and hardening starts. At room temperature, the reaction speed is relatively slow to ensure processability (pot life, rinsability). If the blocking agent X reacts with a dimer resp. oligomer of the two-component or more-component paint system, the polymeric chain reaction is essentially stopped. The chain-stopping reaction depends in particular on the reactivity of the blocking agent X and may be faster than the reaction of the paint components with each other. The smaller the blocking agent molecule, the greater its mobility and generally the greater its reactivity. Conversely, the paint components are less mobile and therefore usually slower to react owing to their essentially greater molecular mass.

If the two-component or more-component paint system is loaded with sufficient blocking agent, no long, essentially insoluble polymers, which could result in deposits are formed, but short-chain molecules, which can for example be kept in solution by the loading agent, which may contain solvent and thus carried away.

All monofunctional molecules, which react with at least one component of a two-component or more-component paint to at least delay, and in some cases essentially prevent, hardening, come into consideration as the blocking agent X. In particular, amines or alcohols, e.g., lower alcohols such as ethanol, propanol, butanol or isomers thereof, are suitable as blocking agent X as long as one of the paint components is an isocyanate.

Reactive agents are also suitable as the blocking agent X, e.g. reaction delayers, for example in the form of organic acid chlorides, which at least delay, and in some cases may essentially or substantially stop hardening.

The blocking agent X may be mixed with customary paint, paint-rinsing or paint-cleaning agents and/or paint solvents. If the blocking agent X cannot be mixed with the paint-rinsing or paint-cleaning agent and/or paint solvent, a solubilizer can be added.

The blocking agent X can be added at any point in the paint circuit, in particular after the mixing of the two-component or more-component paint system.

The blocking agent X can be used with conventional paint, such as a conventional two-component or more-component paint. The blocking agent can in particular be used with conventional rinsing agents, cleaning agents and/or solvents. The portion of blocking agent X lies for example between 5-50%, and in one exemplary illustration lies between 10-30%. The blocking agent X can, however, also be used in a pure form as a rinsing and/or cleaning agent, i.e. the rinsing and/or cleaning agent consists essentially 100% of blocking agent.

The blocking agent is in particular provided to react with a hardener component of the two-component or more-component paint system.

The composition can comprise, in addition to the two-component or more-component paint system and the blocking agent, a rinsing agent, cleaning agent and/or solvent and/or a solubilizer for mixing the blocking agent with the rinsing agent, cleaning agent and/or solvent.

In one example, a coating installation component (e.g. the above-described receiving device, an application apparatus, an atomizer, a colour changer, lines etc.) is at least partially provided (e.g. coated and/or filled and/or permeated) with the blocking agent X and/or the composition comprising a two-component or more-component paint system and the blocking agent. It can at least be delayed, and in some cases essentially prevented, thereby that two-component or more-component paint undesirably hardens and/or undesirably deposits on or in the coating installation component.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claimed invention.

Accordingly, it is to be understood that the above description is intended to be illustrative and not restrictive. Many examples and applications other than those specifically provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A method, comprising:
   using, in a coating installation for motor vehicle body parts, a disposal agent with a first body of a receiving device, the disposal agent having a multi-component paint system that includes at least one paint component and at least one hardener component; and
   using a loading agent with a second body of the receiving device, the loading agent having a blocking agent to react with at least one component of the multi-component paint system, wherein the blocking agent is provided in an amount sufficient to prevent hardening of the multi-component paint system in the coating installation for motor vehicle body parts.

2. The method according to claim 1, wherein the blocking agent is selected from a group consisting of: monofunctional molecules, at least one amine, at least one alcohol, ethanol, propanol, at least one isomer of propanol, butanol, at least one isomer of butanol, a reactive substance, and an organic acid chloride.

3. The method according to claim 1, wherein the blocking agent is provided to react with the at least one hardener component of the multi-component paint system.

4. The method according to claim 1, wherein the blocking agent flows, throughcoats, or fills at least one of:
- a coating installation component
- an application robot;
- an application apparatus;
- an atomizer;
- a bell cup;
- a mixer for mixing the two-component or more-component multi-component paint system;
- a cleaning apparatus for cleaning an application apparatus;
- a colour changer;
- a return line;
- a receiving device for disposal agent;
- a discharge line for discharging disposal agent from the receiving device; or
- a circulation line for returning disposal agent already discharged from the receiving device to the receiving device.

5. The method of claim 1, further comprising mixing the blocking agent with a rinsing agent, a cleaning agent, or a solvent.

6. The method of claim 5, further comprising using a solubilizer to mix the block agent with the rinsing agent, the cleaning agent, or the solvent.

7. The method of claim 5, wherein the block agent is added as monofunctional molecules to the rinsing agent, the cleaning agent, or the solvent.

8. The method of claim 5, wherein the block agent is added as a reactive agent to the rinsing agent, the cleaning agent, or the solvent.

9. The method of claim 1, further comprising applying the coating agent to a section of a coating installation component that is susceptible to contact with a disposal agent.

10. The method of claim 1, wherein the blocking agent inhibits formation of polymer chains.

11. The method of claim 1, further comprising mixing a first component and a second component to form the multi-component paint system, and then, mixing the blocking agent with the multi-component paint system.

12. The method of claim 1, further comprising using the blocking agent in pure form as a rinsing agent.

13. The method of claim 1, wherein the coating installation includes a pump.

14. The method of claim 1, wherein the blocking agent is mixed with the multi-component paint system to form a compound, the blocking agent is present from a dosage of 10-30% by volume or mass of the compound.

15. The method of claim 1, wherein using the disposal agent with the first body of the receiving device includes introducing the disposal agent into the first body in an atomized form.

16. The method of claim 1, wherein the second body surrounds the first body.

17. The method of claim 16 wherein using the loading agent with the second body of the receiving device includes loading an inner surface of the second body with the loading agent.

18. The method of claim 17, further comprising using a second loading agent with a third body of the receiving device.

19. The method of claim 18, wherein using the second loading agent with the third body of the receiving device includes loading the inner surface of the third body with the second loading agent.

* * * * *